US012627209B2

(12) United States Patent
  Rohner et al.

(10) Patent No.: US 12,627,209 B2
(45) Date of Patent: May 12, 2026

(54) CONSTANT FORCE GENERATOR

(71) Applicant: NTI AG, Spreitenbach (CH)

(72) Inventors: Ronald Rohner, Remetschwil (CH); Daniel Ausderau, Frauenfeld (CH)

(73) Assignee: NTI AG, Spreitenbach (CH)

( * ) Notice: Subject to any disclaimer, the term of this patent is extended or adjusted under 35 U.S.C. 154(b) by 414 days.

(21) Appl. No.: 18/346,311

(22) Filed: Jul. 3, 2023

(65) Prior Publication Data
  US 2024/0014724 A1    Jan. 11, 2024

(30) Foreign Application Priority Data

Jul. 6, 2022   (EP) ..................................... 22183245

(51) Int. Cl.
  *H02K 41/02*      (2006.01)
  *H02K 1/12*       (2006.01)
(52) U.S. Cl.
  CPC .............. *H02K 41/02* (2013.01); *H02K 1/12* (2013.01); *H02K 2207/03* (2013.01)
(58) Field of Classification Search
  CPC ....... H02K 1/12; H02K 41/02; H02K 2207/03
  USPC ...................................................... 310/12.15
  See application file for complete search history.

(56) References Cited

U.S. PATENT DOCUMENTS

| | | | | | |
|---|---|---|---|---|---|
| 4,827,164 | A | * | 5/1989 | Horber | H02K 41/03 310/49.36 |
| 7,928,612 | B2 | * | 4/2011 | Chung | H02K 21/22 310/12.24 |
| 8,593,019 | B2 | * | 11/2013 | Chung | H02K 16/00 310/49.35 |
| 10,541,595 | B2 | * | 1/2020 | Zhao | H02K 41/033 |
| 11,139,721 | B2 | * | 10/2021 | Trolliet | H02K 9/227 |

(Continued)

FOREIGN PATENT DOCUMENTS

| | | |
|---|---|---|
| CN | 105570367 A | 5/2016 |
| DE | 102006052453 B3 | 6/2008 |

(Continued)

OTHER PUBLICATIONS

Search Report for European Patent Application No. 22183245.4, 10 pages (Dec. 16, 2022).

*Primary Examiner* — Rashad H Johnson

(74) *Attorney, Agent, or Firm* — Merchant & Gould P.C.

(57) ABSTRACT

A constant force generator comprises a stator having a longitudinal axis and a permanently magnetic stator region, and an armature arranged to be movable relative to the stator in the direction of the longitudinal axis, the armature having a permanently magnetic armature region. The permanently magnetic stator region and the permanently magnetic armature region are each magnetized in a magnetization direction perpendicular to the direction of the longitudinal axis. The permanently magnetic armature region has a first sub-region which has a magnetization having a net magnetization component in a direction opposite to the magnetization direction of the permanently magnetic stator region, so that in the case of an only partly overlapping arrangement of the first sub-region and the permanently magnetic stator region, the net force component has a repulsive net force component which repels the armature away from the stator in the direction of the longitudinal axis.

15 Claims, 7 Drawing Sheets

(56)                    References Cited

U.S. PATENT DOCUMENTS

| | | | |
|---|---|---|---|
| 11,707,170 B2 * | 7/2023 | Conrad | H02K 7/14 |
| | | | 15/377 |
| 11,841,024 B2 * | 12/2023 | Conrad | F04D 13/026 |
| 2009/0072634 A1 * | 3/2009 | Vollmer | H02K 41/033 |
| | | | 310/12.24 |
| 2011/0210689 A1 * | 9/2011 | Vogel | A61B 1/00158 |
| | | | 310/14 |
| 2015/0167770 A1 | 6/2015 | Trangbaek et al. | |
| 2025/0229438 A1 * | 7/2025 | Rohner | B25J 15/0273 |

FOREIGN PATENT DOCUMENTS

| | | | |
|---|---|---|---|
| EP | 0391066 A1 | 10/1990 | |
| EP | 1378986 A1 | 1/2004 | |

* cited by examiner

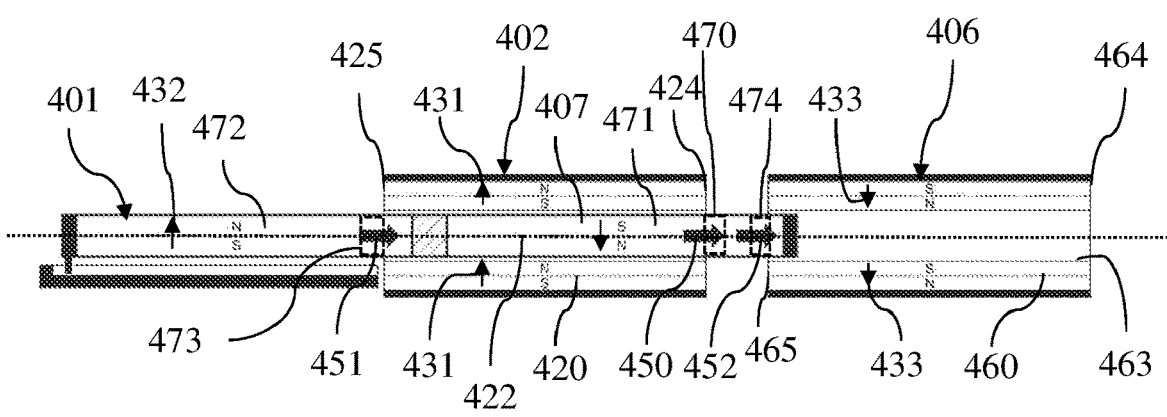
Fig. 10
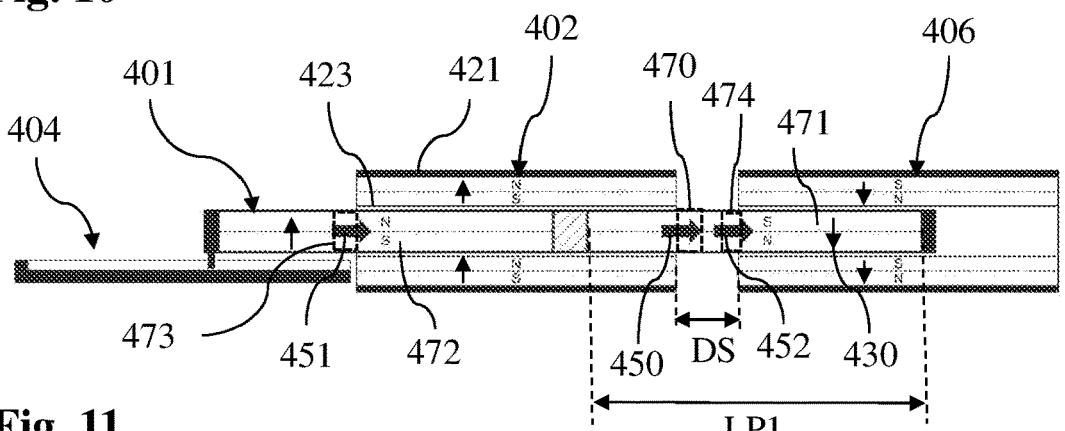
Fig. 11
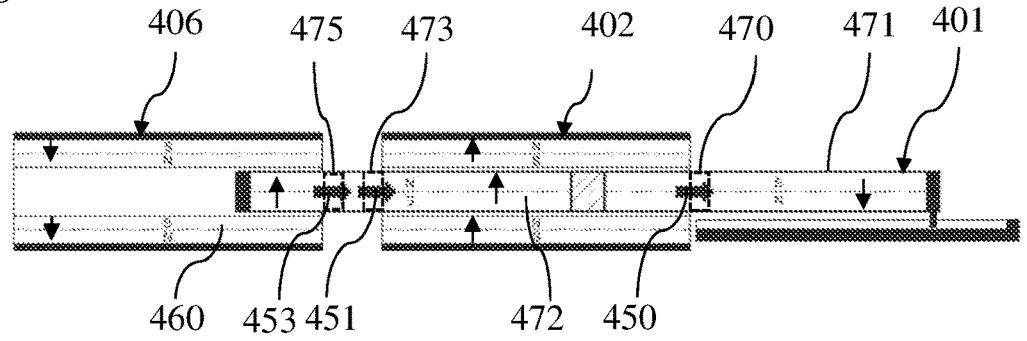
Fig. 12
Fig. 13

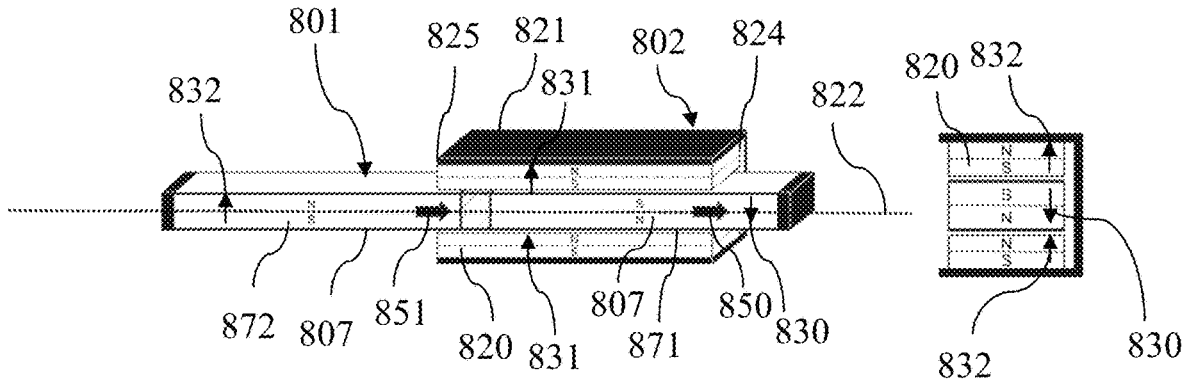
Fig. 21                                              Fig. 22
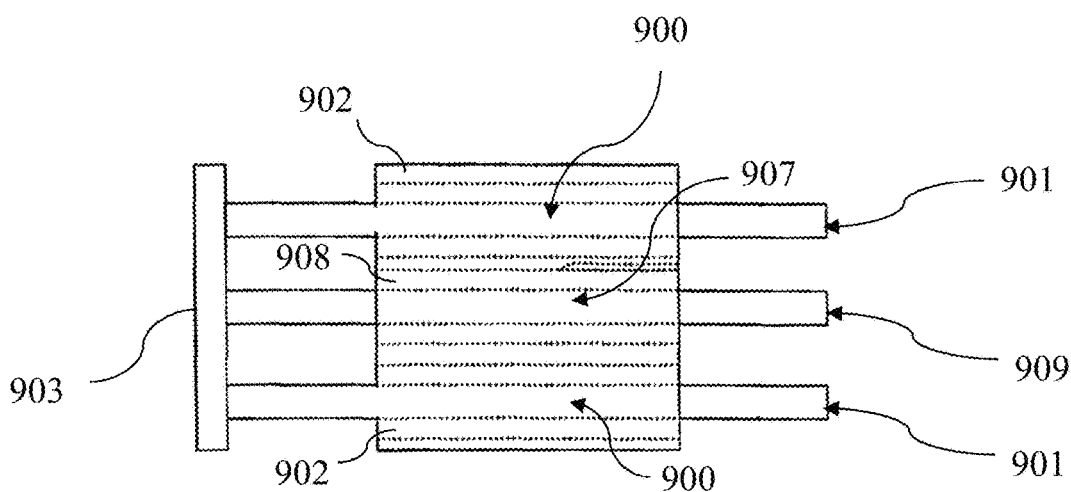
Fig. 23

CONSTANT FORCE GENERATOR

REFERENCE TO RELATED APPLICATION

This application claims the benefit of priority to European Patent Application No. 22183245.4, filed on Jul. 6, 2022, which application is incorporated herein by reference. To the extent appropriate, a claim of priority is made to the above disclosed application.

The present invention relates to a constant force generator according to claim 1 and to a linear drive system according to claim 13.

Linear drive systems are used for moving masses along a (typically) straight travel path. If the straight travel path runs solely in a horizontal direction, the force applied by the linear drive system typically needs only to counteract the inertia of the mass and frictional forces. If, however, the straight travel path runs in a vertical direction or at least has a gradient, the linear drive system needs to apply an additional force in order to counteract the weight force acting on the mass, even when the mass is at rest. In the case of an electromagnetically operated linear drive system, its linear motor must in that case be continuously energised in order to counteract the weight force acting on a mass coupled to the linear drive system and accordingly in order to keep the mass at rest. The continuous energisation of the linear motor subjects the linear motor to additional strain and the linear motor suffers losses (for example due to heat). The (constant) force required which serves only to counteract the weight force can be disproportionately large in relation to the force required for moving the mass.

In order that the linear motor of the linear drive system does not have to be specially designed merely in order to be able to apply the additional constant force for counteracting the weight force, there are various solutions by which a force that counteracts the weight force can be generated by means of an additional device. Such solutions include force-generating elements such as counterweights and mechanical springs as well as pneumatic systems.

A further solution is a constant force generator, in which the weight force is compensated by a magnetic attraction force between permanently magnetic regions that are magnetized in the same direction or between a permanently magnetic region and a magnetically conductive region (for example a ferromagnetic region) having a net force component opposite to the weight force. Such a passive constant force generator has the advantage of neither requiring the application of electrical power in order to compensate the effect of the weight force nor giving rise to high mechanical stresses leading to excess wear.

Another application of a constant force generator is, for example, a process in which the motor needs to apply a constant force, for example for pressing against a closing spring, which force is applied by the constant force generator instead of by the motor. Moreover, a constant force generator mechanically coupled to the motor can be advantageous in that, in the event of a loss of power, the armature can be moved automatically into a desired end position (for example into a safe position) by the magnetic force of the constant force generator. Depending upon the configuration of the constant force generator and the manner of its coupling to the motor, in the event of a lack of power a pushing constant force is able to move the armature forwards or a pulling constant force is able to retract the armature.

EP 1 378 986 A1 describes such a constant force generator. In that constant force generator a armature of the constant force generator is guided in a stator of the constant force generator, both the armature and the stator each having a permanently magnetic region or at least a magnetically conductive region. As a result of a magnetic attraction force acting between the permanently magnetic or magnetically conductive regions of the armature and the stator, the armature is attracted in the direction of the stator. The permanently magnetic or magnetically conductive region of the stator is designed in such a way that the resulting magnetic field is inhomogeneous only in a region of a longitudinal end of that region of the stator, so that the portion of the armature guided inside the stator is subject only to very small magnetic forces or to no magnetic force. The armature is accordingly drawn into the stator only on a sub-portion of the armature that protrudes from the permanently magnetic or magnetically conductive region of the stator, which sub-region is located in the region of the one longitudinal end of the stator. Consequently, the force which the constant force generator transmits by means of the armature is always directed opposite to the direction in which the armature protrudes from the stator or the magnetic region thereof. This is disadvantageous, especially in respect of the installation space required for applications in which the armature is to provide a pushing constant force. Furthermore, this limits the scope for arrangement of the constant force generator relative to the drive motor inside the linear drive system. A further disadvantage of a constant force generator based solely on an attractive magnetic force is that the attractive magnetic force is able to act on the armature only on that side of the stator on which the armature protrudes (that is to say always on only one of the two sides), thus limiting the maximum force acting on the armature. As a further disadvantage, the maximum stroke in the case of a constant force generator based solely on an attractive magnetic force effect is limited to the length of the respective magnetic regions.

Against this background, the problem underlying the invention is to provide a constant force generator and a linear drive system in order to eliminate the above-mentioned disadvantages.

That problem is solved by a constant force generator according to the invention and by a linear drive system according to the invention, as defined by the features of independent claims 1 and 13. Especially advantageous aspects of the constant force generator according to the invention and the linear drive system according to the invention are subject matter of the respective dependent claims.

The constant force generator according to the invention, especially a tubular constant force generator, comprises a stator which has a longitudinal axis and a permanently magnetic stator region, wherein the permanently magnetic stator region has a first longitudinal end and a second longitudinal end which is located axially opposite the first longitudinal end. The constant force generator also has a armature which is arranged so as to be movable relative to the stator over a stroke in the direction of the longitudinal axis, which armature has a permanently magnetic armature region. The permanently magnetic stator region and at least in part also the permanently magnetic armature region are each magnetized in a magnetization direction perpendicular to the direction of the longitudinal axis. The permanently magnetic stator region and the permanently magnetic armature region are arranged so as to be only partly overlapping in the direction of the longitudinal axis over the entire stroke of the armature (there is therefore always a portion of the permanently magnetic armature region that does not overlap the permanently magnetic stator region), so that a magnetic force acting between the permanently magnetic stator region and the permanently magnetic armature region has a net force component in the direction of the longitudinal axis that is constant over the entire stroke. The permanently magnetic armature region has a first sub-region which has a magnetization having a net magnetization component in a direction opposite to the magnetization direction of the permanently magnetic stator region, so that in the case of an only partly overlapping arrangement of that first sub-region and the permanently magnetic stator region such that a longitudinal portion of the first sub-region protrudes from the permanently magnetic stator region in the direction of the longitudinal axis solely at the first longitudinal end of the permanently magnetic stator region, the net force component which is constant over the entire stroke comprises a repulsive constant net force component which repels the armature away from the first longitudinal end of the stator in the direction of the longitudinal axis.

Unlike known constant force generators, the constant force generator according to the invention therefore has a longitudinal portion of the first sub-region of the permanently magnetic armature region with which a repulsive constant net force component can be generated. This repulsive constant net force component is generated whenever the longitudinal portion of the first sub-region of the permanently magnetic armature region protrudes from the permanently magnetic stator region solely at the first longitudinal end of the permanently magnetic stator region, there being structural variants of the constant force generator according to the invention in which the longitudinal portion of the first sub-region always only partly overlaps the permanently magnetic stator region over the entire stroke of the armature irrespective of the armature position (so that the repulsive constant net force component is always generated, irrespective of the current armature position), as well as those structural variants in which this is not the case over the entire stroke of the armature (and accordingly the magnetic constant force acting on the armature, depending upon the current armature position, is not always generated only by the repulsive constant net force component). In each case, however, in the constant force generator according to the invention the repulsive constant net force component is always generated in certain armature positions if the armature is moved over its entire stroke.

The armature of the constant force generator can be coupled to the motor armature of a linear motor of a linear drive system, for example to move a mass that is being acted upon by a weight force. The repulsive constant net force component which repels the armature away from the first longitudinal end of the stator in the direction of the longitudinal axis is here transmitted to the drive armature of the linear drive system and serves to compensate the weight force acting on the mass. Accordingly, the repulsive constant net force component, and therefore the direction in which the armature is repelled away from the first longitudinal end of the stator, is opposite to the direction of the weight force acting on the mass.

To move the mass, the armature of the constant force generator is movable between a fully retracted position and a fully extended position (maximum stroke of the armature). In each armature position (that is to say in the fully retracted position, in the fully extended position and in any armature position between the fully retracted position and the fully extended position) a portion of the permanently magnetic armature region is always arranged so that it does not overlap the permanently magnetic stator region. Accordingly, over the stroke of the armature the (entire) permanently magnetic armature region is therefore arranged so that it always only partly overlaps the permanently magnetic stator region. And if that portion of the permanently magnetic armature region that only partly overlaps the permanently magnetic stator region is the first sub-region, the magnetization direction of which is opposite to the magnetization direction of the permanently magnetic stator region, so that a longitudinal portion of the first sub-region protrudes from the permanently magnetic stator region solely at the first longitudinal end of the permanently magnetic stator region, the repulsive constant net force component is generated. The (entire) permanently magnetic armature region, in addition to having the first sub-region, can also have further sub-regions, however, which can also be permanently magnetic but which can also consist of a magnetically conductive material, as explained in greater detail below.

For the case where the (entire) permanently magnetic armature region consists solely of the first sub-region, the magnetization of which has a net magnetization component in a direction opposite to the magnetization direction of the permanently magnetic stator region, the repulsive constant net force component is generated in any armature position. In this case, in the fully retracted position the first sub-region and the permanently magnetic stator region overlap almost completely in the direction of the longitudinal axis, except for a non-overlapping portion which is short compared with the length of the first sub-region, in which case the repulsive constant net force component acting upon the armature acts on the armature in the direction of the longitudinal axis on precisely that short non-overlapping portion (that is to say on the longitudinal portion of the first sub-region that protrudes from the first longitudinal end of the permanently magnetic stator region). The length of the non-overlapping portion (that is to say of the longitudinal portion that protrudes from the first longitudinal end of the permanently magnetic stator region) in the fully retracted position typically corresponds to 1 times or 2 times the armature diameter and depends upon the geometry, the structure and also the required tolerance of the constant force.

In the fully extended position, the permanently magnetic stator region and the first sub-region have been almost completely displaced relative to one another in the direction of the longitudinal axis, except for a short overlapping portion. As a result of the short overlapping portion, the repulsive constant net force component in the direction of the longitudinal axis is not reduced by marginal effects that could arise at a longitudinal end of the first sub-region (namely if the first sub-region were to be fully withdrawn from the permanently magnetic region of the stator). The length of the overlapping region typically corresponds to from 0.1 times to 1 times the armature diameter and depends upon the geometry, the structure and also the required tolerance of the constant force.

In this case the maximum stroke of the armature accordingly corresponds substantially to the length of the permanently magnetic stator region or of the first sub-region—that is to say of the shorter of the two regions in the case of different lengths, minus the length of the said overlapping or non-overlapping portion. In order, where possible, to be able to make full use of the permanently magnetic regions for generating a constant force, the first sub-region (of the permanently magnetic armature region) is preferably slightly longer (about 1 times to 2 times the armature diameter) than the permanently magnetic stator region.

Because the magnetization direction of the permanently magnetic stator region and the direction of the net magnetization component of the magnetization of the first sub-region (being part or all of the permanently magnetic armature region) are each perpendicular to the direction of the longitudinal axis and opposite to one another, on the one hand a repulsive magnetic force acts between the first sub-region and the permanently magnetic stator region. On the other hand, this makes it possible for the repulsive net force component to remain constant even in the event of movement of the armature relative to the stator. The phrase 'perpendicular relative to the direction of the longitudinal axis' in relation to the magnetization direction also includes deviations from an exactly perpendicular direction relative to the longitudinal axis, such as, for example, a deviation of in each case+/−20° (from the exactly perpendicular direction). The phrase 'opposite to one another' in relation to the magnetization directions likewise includes cases where a sufficiently constant repulsive net force component for the application in question is generated, such as, for example, in the case of deviations of in each case+/−20° from an exactly opposite magnetization direction.

The permanently magnetic stator region is typically designed in such a way that the strength of the magnetization, viewed in the direction of the longitudinal axis, is constant over the length of the permanently magnetic stator region in order to generate a magnetic field which, viewed in the direction of the longitudinal axis, is homogeneous over the length of the permanently magnetic stator region and declines away from the first longitudinal end and from the second longitudinal end of the permanently magnetic stator region, viewed along the longitudinal axis. The magnetic field is therefore inhomogeneous at those locations. The strength of the magnetization of the first sub-region of the permanently magnetic armature region, viewed in the direction of the longitudinal axis, is constant over the length of the first sub-region of the permanently magnetic armature region. Between the fully retracted and fully extended positions of the armature (that is to say over the entire stroke) there is then always a longitudinal portion (of the same length) of the first sub-region in that inhomogeneous magnetic field. As a result, a constant net force component acts in the direction of the longitudinal axis upon that longitudinal portion of the first sub-region and accordingly upon the armature, which net force component repels the armature away from the first longitudinal end of the stator in the direction of the longitudinal axis.

This can be advantageous from a structural standpoint and saves installation space in an application in which the constant force generator is used for pushing. In such an application the armature then need not—as in the case of a constant force generator based solely on an attractive magnetic force, as described in EP 1 378 986—be extended through the stator in order to be able to utilise the pushing force.

Furthermore, a constant force generator based on a repulsive magnetic force in combination with a (permanently magnetic) second sub-region of the permanently magnetic armature region which interacts attractively with the permanently magnetic stator region enables the constant force that can be generated by the constant force generator to be increased or the maximum stroke of the armature to be increased, as will be explained below.

In accordance with an aspect of the constant force generator according to the invention, the direction of the magnetization of the first sub-region of the permanently magnetic armature region is opposite to the magnetization direction of the permanently magnetic stator region. In the case of this exactly opposite direction of the magnetizations of the permanently magnetic stator region and the first sub-region, for a predetermined strength of magnetization the maximum possible repulsive constant net force component that repels the armature in the direction of the longitudinal axis away from the first longitudinal end of the stator is generated.

It can also be desirable, however, that a repulsive constant force that is smaller than the maximum possible be generated, without a different (from the structural standpoint) constant force generator being necessary for that purpose. Accordingly, in accordance with a further aspect of the constant force generator according to the invention the direction of the magnetization of the first sub-region of the permanently magnetic armature region and the magnetization direction of the permanently magnetic stator region enclose an obtuse angle (azimuthal in relation to the longitudinal axis) (the direction of the magnetization of the first sub-region therefore runs at an obtuse angle 'obliquely' with respect to the magnetization direction of the permanently magnetic stator region). As a result, only the net magnetization component of the magnetization of the first sub-region, which runs (exactly) opposite to the magnetization direction of the permanently magnetic stator region, has a force-building effect in the generation of the repulsive constant force (acting in an axial direction). This enables the strength of the constant force generated to be adjusted via the size of the enclosed obtuse angle, which is easy to implement structurally (for example with the aid of a corresponding guide means and anti-rotation device), this also applying analogously hereinbelow to the case of an additional attractive constant force.

In accordance with an aspect of the constant force generator according to the invention, the permanently magnetic armature region has a second sub-region which either is permanently magnetic and has a magnetization having a net magnetization component in a direction identical with the magnetization direction of the permanently magnetic stator region, or which consists of a magnetically conductive material. A 'magnetically conductive material' is here understood to be a material having a relative magnetic permeability (permeability number) of $\mu_r \gg 1$ (such as, for example, in the case of ferromagnetic materials). In the case of an only partly overlapping arrangement of the second sub-region and the permanently magnetic stator region such that a longitudinal portion of the second sub-region protrudes in the direction of the longitudinal axis solely at the second longitudinal end of the permanently magnetic stator region, the net force component which is constant over the entire stroke then comprises an attractive constant net force component which attracts the armature towards the second longitudinal end of the stator in the direction of the longitudinal axis, the attractive and repulsive constant net force components pointing in the same direction.

In the case of the only partly overlapping arrangement of the first sub-region and the permanently magnetic stator region, a longitudinal portion of the first sub-region protrudes from the first longitudinal end in the direction of the longitudinal axis, so that the repulsive net force component acts on the protruding longitudinal portion of the first sub-region.

In the case of the only partly overlapping arrangement of the second sub-region and the permanently magnetic stator region such that a longitudinal portion of the second sub-region protrudes from the permanently magnetic stator region in the direction of the longitudinal axis solely at the second longitudinal end of the permanently magnetic stator region, the attractive constant net force component acts on the protruding longitudinal portion of the second sub-region.

Depending upon the structural configuration, this can be utilised to increase the constant force that can be generated by the constant force generator (namely if the attractive and repulsive net force components act simultaneously: the repulsive net force component at the first longitudinal end and the attractive net force component at the second longitudinal end of the permanently magnetic stator region). Or—if the constant force remains the same—it can be used to increase the maximum possible stroke of the armature (namely, if in each case either only the attractive net force component or only the repulsive net force component or, in a transition region, the attractive and repulsive net force components simultaneously—which net force components will each be slightly smaller due to the increase or decrease in force—act at the second and first longitudinal ends, respectively, of the permanently magnetic stator region).

Such an arrangement of the longitudinal portion of the first sub-region or of the second sub-region has the result that, on the one hand, either the first sub-region or the second sub-region (or both) partly overlap(s) the permanently magnetic stator region. On the other hand, simultaneously with the overlapping, a longitudinal portion of the first sub-region or of the second sub-region also always protrudes from the first or the second longitudinal end, respectively, of the permanently magnetic stator region, so that either the corresponding repulsive net force component or the attractive net force component (or both) are generated.

Because the repulsive force component and the attractive force component act at oppositely located longitudinal ends of the permanently magnetic stator region on the longitudinal portions protruding therefrom, both net force components act in the same direction.

In accordance with an aspect of the constant force generator according to the invention, in the case where the second sub-region of the permanently magnetic armature region is permanently magnetic, the strength of the magnetization of the second sub-region is constant over its length, viewed in relation to the direction of the longitudinal axis, and in the case where the second sub-region of the permanently magnetic armature region is magnetically conductive, the magnetic conductivity of the second sub-region is constant over its length, viewed in the direction of the longitudinal axis.

In accordance with a further aspect of the constant force generator according to the invention, the first sub-region and the second sub-region of the permanently magnetic armature region are arranged spaced apart from one another in the direction of the longitudinal axis by a distance that is smaller than (approximately) 90% of the length of the permanently magnetic stator region.

This has the advantage that the repulsive and attractive constant net force components act simultaneously upon the armature. The force acting upon the armature corresponds to the sum of the attractive and repulsive constant net force components. The stroke of the armature, during which the sum of the two net force components acts on the armature, in this case corresponds to the length of the permanently magnetic stator region minus the distance between the first permanently magnetic sub-region and the second sub-region in the direction of the longitudinal axis. This means that the distance between the first sub-region and the second sub-region is as small as possible in the interests of as large as possible a stroke during which both the attractive and the repulsive constant net force components are effective. The distance can in principle even be zero, at least if the first sub-region and the second sub-region are both permanently magnetic; in that case they abut one another. It is also possible, however, for a spacer disc (ideally made of a magnetically non-conductive material) to be arranged between the two sub-regions. This can be advisable, for example, for manufacturing reasons, because it is in that way possible to prevent the magnets of the two permanently magnetic sub-regions from striking one another during assembly, which could otherwise result in damage to the brittle magnets.

In accordance with a further (alternative) aspect of the constant force generator according to the invention, the first sub-region and the second sub-region of the permanently magnetic armature region are spaced apart from one another in the direction of the longitudinal axis by a distance that is substantially the same as the length of the permanently magnetic stator region. That length is to be understood as being a length which can deviate from the length of the permanently magnetic stator region by up to ±1 armature diameter (a armature diameter in the case of a tubular constant force generator).

This has the advantage that the attractive and repulsive constant net force components act upon the armature as it were in succession. If, during the movement of the armature, the first sub-region or the second sub-region stops overlapping the permanently magnetic stator region, the respective other of the first sub-region and the second sub-region begins to overlap the permanently magnetic stator region of the stator. Accordingly—with the exception of a transition region—a longitudinal portion either of the first sub-region or of the second sub-region is always located at one of the first and second longitudinal ends of the permanently magnetic stator region (that is to say in the inhomogeneous magnetic field). As a result, always either (only) the repulsive or (only) the attractive constant net force component acts upon the armature. In the transition region, in which both the first and the second sub-regions are located partly in the inhomogeneous magnetic field regions at the ends of the permanently magnetic stator region, in each case a portion of the constant force acts upon the first sub-region and a portion of the constant force acts upon the second sub-region, with the result that the two (partial) constant forces add up to the constant force that is generated when it is generated by only one sub-region (that is to say either by the first sub-region or by the second sub-region). In comparison with a constant force generator that is based solely on an attractive magnetic force, the maximum stroke of the armature can thus be increased, while the constant force is effective. In embodiments in which the first sub-region and the second sub-region are each of the same length, the maximum possible stroke of the armature is accordingly as it were doubled.

In accordance with a further aspect of the constant force generator according to the invention, the constant force generator comprises a further stator having a further stator region which either is permanently magnetic and has a magnetization having a net magnetization component magnetized in the direction of the magnetization of the first sub-region of the permanently magnetic armature region, or which consists of a magnetically conductive material. The further stator region has a further first longitudinal end as well as a further second longitudinal end which is located axially opposite the further first longitudinal end, the further second longitudinal end of the further stator region facing towards the first longitudinal end of the permanently magnetic stator region. The first sub-region of the permanently magnetic armature region and the further stator region are arranged so as to be only partly overlapping in the direction of the longitudinal axis in such a way that a further longitudinal portion of the first sub-region protrudes from the further permanently magnetic stator region in the direction of the longitudinal axis solely at the further second longitudinal end of the further permanently magnetic stator region, so that a magnetic force acting between the first sub-region and the further stator region has a further constant net force component in the direction of the longitudinal axis which attracts the armature towards the further stator, that further constant net force component pointing in the same direction as the repulsive constant net force component.

This has the advantage that the entire force acting upon the armature can be increased by the further constant net force component, that is to say if the further constant net force component additionally acts upon the first sub-region (which is permanently magnetic) through the further stator region—regardless of whether that further stator region is permanently magnetic or consists of a magnetically conductive material. The further stator is here arranged in fixed position relative to the (first-mentioned) stator.

In accordance with a further aspect of the constant force generator according to the invention, in the case where the further stator region is permanently magnetic, the strength of the magnetization of the permanently magnetic further stator region is constant over its length, viewed in the direction of the longitudinal axis, in order to generate a magnetic field which, viewed in the direction of the longitudinal axis, is homogeneous over the length of the further permanently magnetic stator region and declines away from the further first longitudinal end and from the further second longitudinal end of the further permanently magnetic stator region, viewed along the longitudinal axis, and in the case where the further stator region is magnetically conductive, the magnetic conductivity of the magnetically conductive further stator region is constant over its length, viewed in the direction of the longitudinal axis.

In a further embodiment of the constant force generator according to the invention, the stator has, in cross-section, a hollow profile (for example a closed hollow profile) having an inner wall for guidance of the armature. Alternatively the hollow profile can also be open on one side, in which case, however, the guidance of the armature must be effected in such a way that the armature cannot escape out of the open side of the hollow profile.

'Cross-section' is here to be understood as being a section along a plane perpendicular to the longitudinal axis of the stator. The armature is guided in such a way that it is virtually immovable in such a plane perpendicular to the longitudinal axis. In contrast, the movability of the armature in the direction of the longitudinal axis is not adversely affected. For that purpose, the armature can be guided in a sliding inlay (for example made of polyoxymethylene, POM). In the case of a stator having an angular hollow profile and a corresponding cross-sectional profile of the armature it is also possible to prevent rotation of the armature about the longitudinal axis.

As already mentioned, the constant force generator according to the invention is especially a tubular constant force generator.

A tubular constant force generator has, in cross-section, a circular-cylindrical hollow profile (internal profile) of the stator and also a corresponding circular-cylindrical external profile of the armature. These are very well-established forms of armature and stator which can be easily and reliably produced.

In accordance with a further aspect of the constant force generator according to the invention, the constant force generator comprises a securing device against rotation of the armature relative to the stator about the longitudinal axis.

Magnets that interact with one another are—as far as possible—aligned with one another so that their magnetization directions point in the same direction (so that the magnets attract). In the case of a tubular constant force generator based on repulsive magnetic forces, the armature would therefore—as far as possible—rotate into a position in which the magnetization directions of the permanently magnetic armature region and the permanently magnetic stator region were identical. A securing device against rotation of the armature about the longitudinal axis prevents such self-acting (and undesirable) alignment of the armature relative to the stator.

In a further embodiment of the constant force generator according to the invention, the strength of the magnetization of the second sub-region of the permanently magnetic armature region (insofar as that second sub-region is permanently magnetic) is reduced by from 10% to 40% relative to the strength of the magnetization of the first sub-region of the permanently magnetic armature region.

If the first sub-region of the permanently magnetic armature region and the second sub-region of the permanently magnetic armature region (insofar as the latter is permanently magnetic) have the same dimensions and the same strength of magnetization, the repulsive constant net force component is reduced by approximately 10-40% relative to the attractive constant net force component. A corresponding reduction in the strength of the magnetization of the second sub-region of the permanently magnetic armature region relative to the first sub-region of the permanently magnetic armature region has the advantage that, if the two permanently magnetic regions have the same dimensions, the attractive and the repulsive constant net force components are of equal magnitude. This is especially advantageous in the case of the embodiment in which the first sub-region and the second sub-region of the permanently magnetic armature region are separated from one another by a distance of substantially the length of the permanently magnetic stator region. As a result, the constancy of the force exerted on the armature is ensured over the maximum stroke thereof. A magnetization of the second sub-region that is reduced by from 10% to 40% can be achieved, for example, by reducing the magnetization strength of the permanently magnetic material thereof or by adapting the geometry (for example a smaller cross-section of the permanently magnetic material). In the case where the second sub-region consists of a magnetically conductive (for example ferromagnetic) material, as an equivalent measure the magnetization of the first sub-region can be reduced accordingly to adapt the force.

In the case of the embodiment in which the first sub-region and the second sub-region of the permanently magnetic armature region are separated from one another by a distance that is smaller than 90% of the length of the permanently magnetic stator region (and is even as small as possible down to zero), in which case the repulsive and attractive net force components therefore always both act at the same time on the two longitudinal ends of the stator over the stroke of the armature, that is less relevant: although in this embodiment the constant net force components generated at the two longitudinal ends of the permanently magnetic stator region are of different magnitudes, only the magnitude of the constant net force component generated overall (repulsive plus attractive constant net force component) is of relevance there, and not its distribution to the two longitudinal ends.

In accordance with a further aspect, the constant force generator according to the invention has a return tube which encompasses the permanently magnetic stator region of the stator and/or the further permanently magnetic stator region of the further stator. Such a return tube guides the magnetic flux in the said return tube, so that there is practically no magnetic field outside the return tube.

The linear drive system according to the invention comprises a linear motor, especially a tubular linear motor, which comprises a motor stator having a drive longitudinal axis, and a motor armature which is movable relative to the motor stator in the direction of the drive longitudinal axis. The linear drive system according to the invention further comprises a constant force generator according to the invention, as described above.

The linear drive system according to the invention offers the same advantages as the constant force generator according to the invention as regards the compensation of the weight force of the mass being moved. In addition, it comprises the linear motor for moving the mass.

In accordance with an aspect of the linear drive system according to the invention, the motor armature is axially fixedly connected to the armature of the constant force generator.

In accordance with a further aspect of the linear drive system according to the invention, the linear drive system comprises at least two constant force generators according to the invention, the armatures of the at least two constant force generators according to the invention being axially fixedly connected to one another and axially fixedly connected to the motor armature.

Further advantageous aspects and configurations will be found in the following description of embodiments of the invention with the aid of the diagrammatic drawings, wherein:

FIG. 10-13 show a longitudinal section through a fifth embodiment of the constant force generator according to the invention (different armature positions);

FIG. 21 shows a perspective view of an eighth embodiment of the constant force generator according to the invention;

FIG. 22 shows a cross-section through the eighth embodiment of the constant force generator according to the invention, and FIG. 23 is a view of an embodiment of a linear drive system according to the invention having a constant force generator according to the invention.

The following description of embodiments with the aid of the individual Figures is illustrated in principle with the aid of horizontal arrangements because the Figures can in that way be arranged in a more space-saving way. The actual arrangement has been designed predominantly for non-horizontal applications, however, because it is in those applications that the weight force of a (load) mass (or at least substantial proportions thereof) is to be compensated by the constant force generator.

Figure 1:
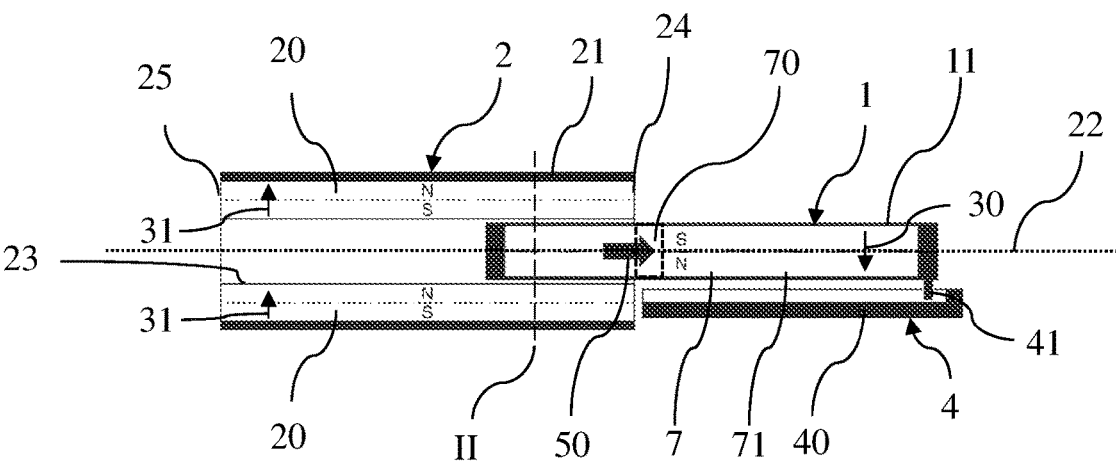
FIG. 1 shows a longitudinal section through a first embodiment of the constant force generator according to the invention.

FIG. 1 shows a longitudinal section through a first embodiment of the constant force generator according to the invention which comprises a (static) stator 2 having a longitudinal axis 22. The stator 2 has a hollow profile which is rotationally symmetrical in relation to the longitudinal axis 22 and has an inner wall 23. Furthermore, the stator 2 has a permanently magnetic stator region 20 which is arranged coaxially with respect to the longitudinal axis 22 and at least partly surrounds the inner wall 23. The permanently magnetic stator region 20 is magnetized in a magnetization direction 31 perpendicular to the longitudinal axis 22. Accordingly, the magnetic poles are denoted by "N" for north pole and "S" for south pole. The stator 2 further comprises a return tube 21 which encompasses the permanently magnetic region 20 of the stator 2 and, made of a magnetically conductive material, serves for better guidance of the magnetic flux.

Between a first longitudinal end 24 and a second longitudinal end 25 of the permanently magnetic stator region 20, the strength of the magnetization of the permanently magnetic stator region 20 is constant. Consequently, the magnetic field generated by the permanently magnetic stator region 20 is homogeneous in relation to the longitudinal axis 22. Outside the permanently magnetic stator region 20, the strength of the magnetic field generated by the permanently magnetic stator region 20 declines from the respective longitudinal ends 24, 25 viewed in the direction of the longitudinal axis 22. Outside the permanently magnetic stator region 20 and in the vicinity of the longitudinal end 24, 25, the magnetic field generated by the permanently magnetic stator region 20 is therefore inhomogeneous.

The constant force generator further comprises an armature 1 which is mounted so as to be movable in the direction of the longitudinal axis 22 of the stator 2. The armature 1 is guided inside the inner wall 23, for which purpose a sliding inlay (not shown in the Figures), for example made of polyoxymethylene (POM), can be provided at that location. The armature 1 has a permanently magnetic armature region 7 comprising a first sub-region 71 which in this embodiment corresponds to the entire permanently magnetic armature region 7. The armature 1 further comprises a armature tube 11 made of a magnetically non-conductive material, for example of chrome steel or high-grade steel, which encompasses the permanently magnetic armature region 7.

The first sub-region 71 of the permanently magnetic armature region 7 is magnetized in a magnetization direction 30 perpendicular to the longitudinal axis 22 of the stator 2 and opposite to the magnetization direction 31 of the permanently magnetic stator region 20. In addition, in this embodiment the first sub-region 71 is the same length as the permanently magnetic stator region 20 in the direction of the longitudinal axis 22 and the strength of its magnetization is constant in relation to the longitudinal axis 22. A longitudinal portion 70 of the first sub-region 71 is located in the inhomogeneous magnetic field generated by the permanently magnetic stator region 20 close to the first longitudinal end 24 of the stator 2. Because the strength of the magnetic field in this inhomogeneous region, in which the longitudinal portion 70 is located, declines (in magnitude) from the first longitudinal end 24 away from the stator in the direction of the longitudinal axis, a repulsive net force component 50 (arrow in FIG. 1) acts on that longitudinal portion 70. That repulsive net force component 50 repels the armature 1 away from the stator 2 in the direction of the longitudinal axis 22. For better understanding, the longitudinal portion 70 (the region axially defined by the two dashed lines) is shown in simplified form. Irrespective of the particular position of the armature relative to the stator 2, it is, however, the case that in any desired armature position over the entire stroke a portion of the first sub-region 71 is always arranged inside the permanently magnetic stator region 20, while another portion of the first sub-region 71 is always arranged outside the permanently magnetic stator region 20, so that always only a portion of the first sub-region 71 overlaps the permanently magnetic stator region 20. This means that in any desired armature position over the entire stroke there is always a longitudinal portion 70 of the same length upon which the repulsive net force component 50 acts, with the result that the said repulsive net force component is constant.

Moreover, the constant force generator comprises a securing device 4 which prevents rotation of the armature 1 relative to the stator 2 about the longitudinal axis 22 thereof. Without such a securing device, in the case of a tubular constant force generator the armature 1 of the constant force generator would self-actingly rotate relative to the stator 2 until the magnetization direction 30 of the first sub-region 71 of the permanently magnetic armature region 7 was the same as the magnetization direction 31 of the permanently magnetic stator region 20. The securing device 4 is here indicated diagrammatically in the form of a linear guide means 40 (for example having a groove) which can be connected to the stator 2 so as to be fixed against rotation and in which a securing pin 41 is guided in the direction of the longitudinal axis 22. Other securing devices are likewise conceivable.

Figure 2:
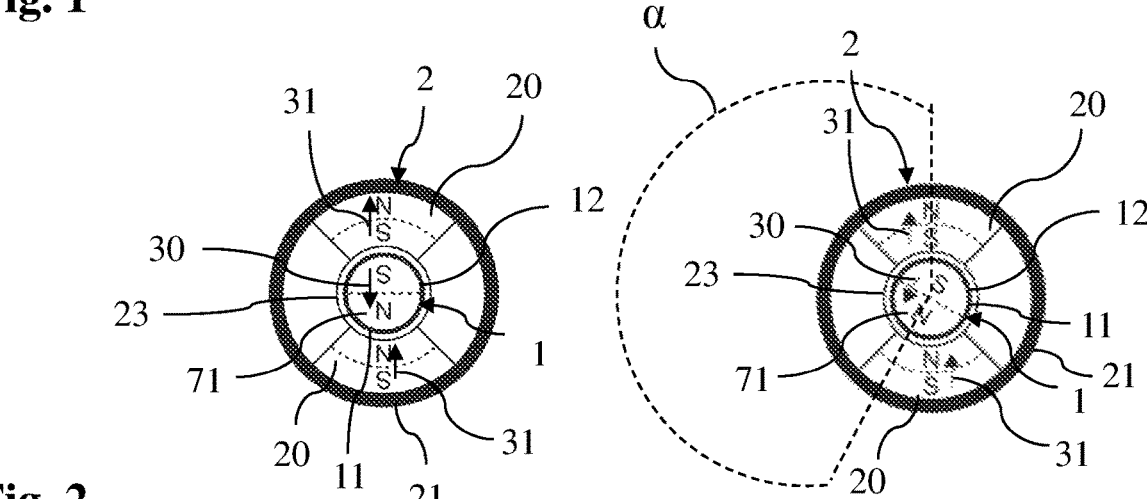
FIG. 2 shows a cross-section through the first embodiment according to line II in FIG. 1 with opposite magnetization directions (shown on the left) and with magnetization directions that enclose an obtuse angle (shown on the right)

FIG. 2 shows a cross-section through the embodiment of the constant force generator according to the invention shown in FIG. 1 along the line labelled II in FIG. 1 (shown on the left in FIG. 2). As can be seen therein, it is a tubular constant force generator, that is to say a constant force generator which, in cross-section, has a circular-cylindrical hollow profile (internal profile) of the stator 2 as well as a corresponding circular-cylindrical profile of the armature 1 (external profile) having an outer wall 12 of the armature tube 11. The permanently magnetic stator region 20 comprises two circular-cylindrical segments which are arranged around the inner wall 23 diametrically with respect to the longitudinal axis 22. The first sub-region 71 of the permanently magnetic armature region 7 is completely circular-cylindrical and magnetized in the magnetization direction 30 perpendicular to the longitudinal axis 22. The non-magnetic armature tube 11 encompasses the first sub-region 71. The embodiment shown in FIGS. 1 and 2 is accordingly a 'two-pole' constant force generator, that is to say the first sub-region 71 of the permanently magnetic armature region 7 and the permanently magnetic stator region 20 each have only one magnetization direction 30, 31. Accordingly, the first sub-region 71 and the permanently magnetic stator region 20 each have two poles, a north pole and a south pole, which are accordingly labelled "N" and "S" in the drawings.

It can likewise be seen in FIG. 2 (shown on the right in FIG. 2) how it is possible to reduce the repulsive net force component in a structurally simple way. To that end the direction 30 of the magnetization of the first sub-region 71 of the permanently magnetic armature region 7 encloses an obtuse angle α with the magnetization direction 31 of the permanently magnetic stator region 20. Only that proportion of the magnetization of the armature which is exactly opposite to the magnetization direction of the permanently magnetic stator region 20 contributes to the generation of the repulsive net force component. Because that proportion falls with increasing deviation of the angle α from 180°, the repulsive net force component is also reduced. This does not, however, alter the fact that the repulsive net force component generated is constant; it is just slightly smaller. It will immediately be understood that for that purpose the armature 1 must be guided so that this angular position is achieved, but this is possible, for example, with a securing device 4, the angle of which is adjustable (azimuthally relative to the longitudinal axis 22) (here diagrammatically in the form of the linear guide means 40 and the securing pin 41).

Figure 3:
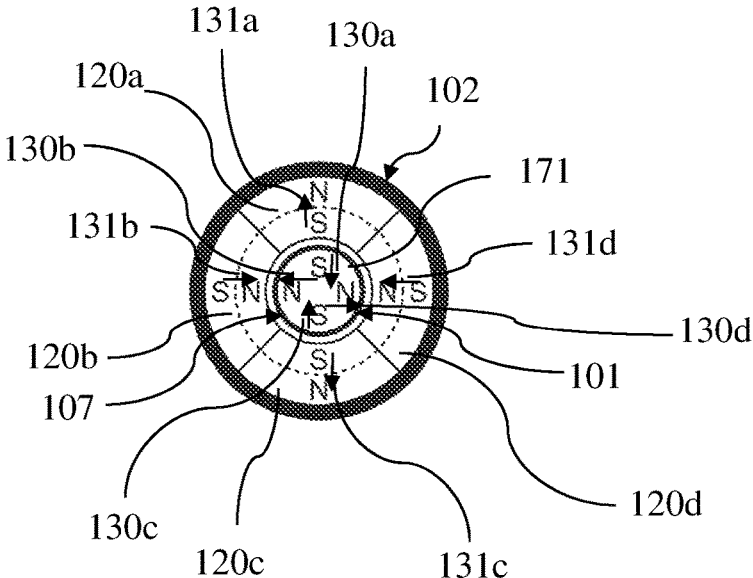
FIG. 3 shows a cross-section through a second embodiment of the constant force generator according to the invention.

FIG. 3 shows a cross-section through a second embodiment of the constant force generator according to the invention. Apart from the respective permanently magnetic regions and the sub-regions thereof, the second embodiment is identical in construction to the first embodiment and the cross-section in FIG. 3 is therefore similar to that in FIG. 2. The armature 101 comprises the permanently magnetic armature region 107 having a first sub-region 171 which in this case, however, is magnetized in such a way that it has two north poles and two south poles, therefore in total four poles ('four-pole' embodiment). The magnetization directions 130a, 130b, 130c, 130d indicated by arrows in FIG. 3 correspond to the local magnetization directions on the outer side of the first sub-region 171. The stator 102 comprises a permanently magnetic stator region which is composed of four permanently magnetic stator regions 120a, 120b, 120c, 120d, each of the stator regions 120a, 120b, 120c, 120d having a different magnetization direction 131a, 131b, 131c, 131d perpendicular to the longitudinal axis. Each of the magnetization directions 131a, 131b, 131c, 131d is opposite to the local magnetization direction 130a, 130b, 130c, 130d of the respectively oppositely arranged portion of the first sub-region 171. As a result, the total repulsive magnetic force that acts between the first sub-region 171 of the armature 101 and the permanently magnetic stator region (and accordingly especially also the repulsive net force component acting upon the longitudinal portion of the sub-region 171 of the armature 101 arranged in the inhomogeneous magnetic field) is increased in comparison with the otherwise identically constructed two-pole embodiment.

Figure 4:
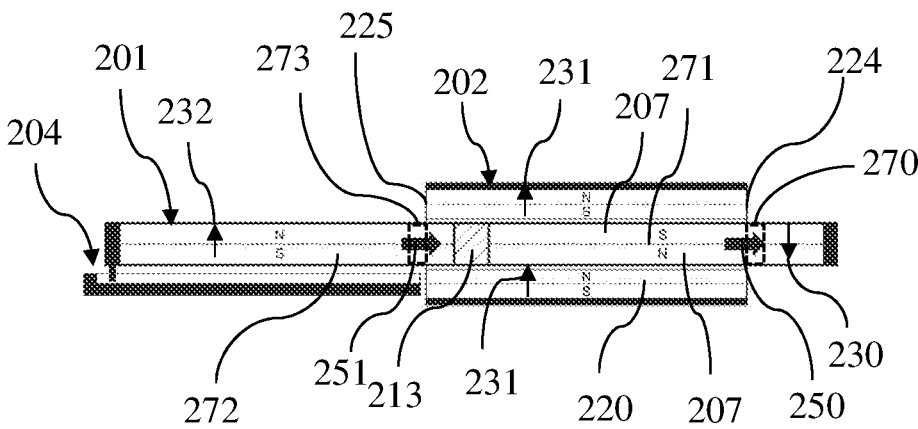
FIG. 4-6 show a longitudinal section through a third embodiment of the constant force generator according to the invention (different armature positions)
Figure 5:
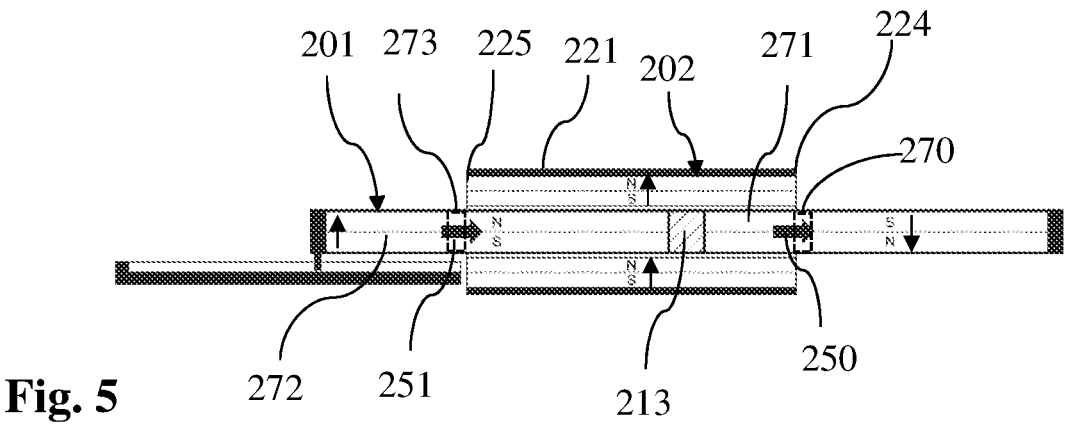
Figure 6:
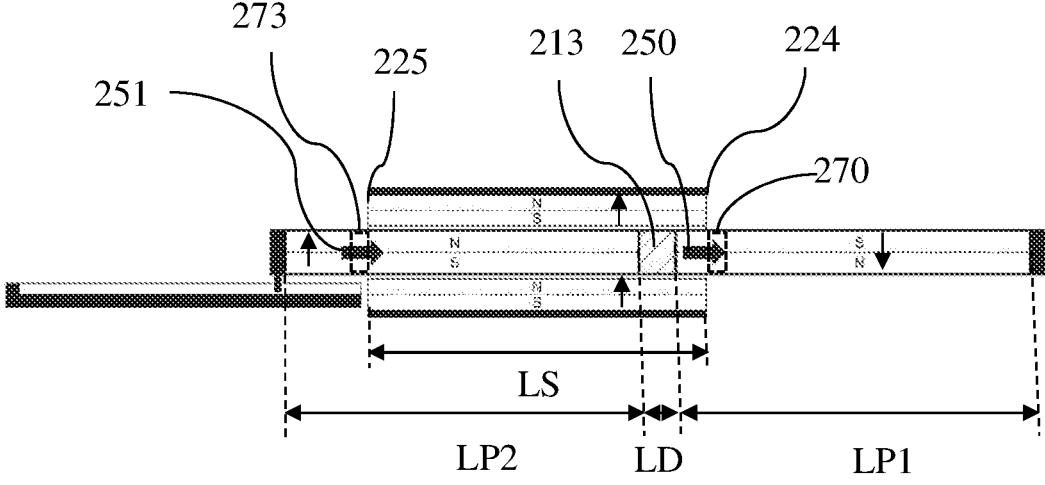

FIG. 4-FIG. 6 show a longitudinal section through a third embodiment of the constant force generator according to the invention, and namely in FIG. 4 in a first relative arrangement of armature and stator. This third embodiment comprises the stator 202, which is identical in construction to the stator 2 of the first embodiment (the corresponding reference numerals have each been increased by two hundred) and which has a return tube 221. The armature 201, which has the same cross-sectional dimensions as the armature 1 and is analogously arranged so as to be movable relative to the stator 202 in the direction of the longitudinal axis, comprises a permanently magnetic armature region 207 which, in addition to having a first sub-region 271—which corresponds to the first sub-region of the first embodiment—has a second sub-region 272. The first sub-region 271 and the second sub-region 272 are spaced apart (separated) from one another by a magnetically non-conductive armature region 213 (for example a spacer disc made of a magnetically non-conductive material). As already described hereinabove, this spatial separation of the first sub-region 271 and the second sub-region 272 is not absolutely necessary, but it can have production-related and economic advantages. The dimensions of the second sub-region 272 correspond to those of the first sub-region 271. The second sub-region 272 can be permanently magnetic, but it can also consist of a magnetically conductive material (for example a ferromagnetic material) which has no magnetization. In the described embodiment, the second sub-region is permanently magnetic. However, the magnetization direction 232 of the second sub-region 272 is opposite to the magnetization direction 230 of the first sub-region 271 and accordingly has the same direction as the magnetization direction 231 of the permanently magnetic stator region 220. As in the first embodiment, in the arrangement shown in FIG. 4 a repulsive (constant) net force component 250 acts upon the armature 201 at the first longitudinal end 224 of the stator 202, which net force component acts on the longitudinal portion 270 of the first sub-region 271 that protrudes from the first longitudinal end 224. In addition to the repulsive net force component 250, an attractive (constant) net force component 251 acts on the second longitudinal end 225 which is located opposite the first longitudinal end 224 (this also applies if the second sub-region 272 is not permanently magnetic but consists of a magnetically conductive material). The attractive net force component acts on a longitudinal portion 273 of the second sub-region 272 which protrudes from the permanently magnetic stator region 220 at the second longitudinal end 225. This attractive net force component 251 points in the same direction as the repulsive net force component 250. Accordingly, overall the armature 201 is acted upon by the sum of the two net force components 250, 251. A securing device 204 against rotation of the armature 201 relative to stator 202 is identical in construction to the securing device 4 of the first embodiment and in alternative embodiments can also be arranged at the opposite end.

FIG. 5 shows a second relative arrangement of the stator and armature of the third embodiment of the constant force generator according to the invention. In comparison with the first arrangement, the armature 201 has been moved in the direction of the longitudinal axis (here: to the right). The repulsive net force component 250 acts on the longitudinal portion 270 of the first sub-region 271 and the attractive net force component 251 acts on the longitudinal portion 273 of the second sub-region 272. Since the strength of the respective magnetization is constant over the first sub-region 271 and the second sub-region 272, the repulsive net force component 250 acting on the armature 201 at the first longitudinal end 224 of the permanently magnetic stator region 220 and the attractive net force component 251 at the second longitudinal end 225 are of the same magnitude as in the first arrangement shown in FIG. 4.

FIG. 6 shows a third relative arrangement of the stator and armature of the third embodiment of the constant force generator according to the invention. In this third relative arrangement the armature 201 has been moved even further in the direction of the longitudinal axis (here: to the right). Accordingly, in the region of the first longitudinal end 224 of the stator 202 the repulsive net force component 250 acts on the longitudinal portion 270 of the first sub-region 271 and the attractive net force component 251 acts on the longitudinal portion 273 of the second sub-region 272. The length LD of the magnetically non-conductive armature region 213 (for example a spacer disc made of magnetically non-conductive material) is substantially shorter than the length LS of the permanently magnetic stator region 220 (in the interests of as large as possible a stroke) and can also be zero (no spacer disc, see above). It is also substantially shorter than the length LP1 of the first sub-region 271 and the length LP2 of the second sub-region 272, the lengths LP1, LP2, and the length LS of the permanently magnetic stator region 220 being the same. It can be seen from FIG. 6 that the maximum possible stroke of the armature at which the sum of the repulsive net force component 250 and the attractive net force component 251 is exerted on the armature is limited to the length LS of the stator minus the length LD of the magnetically non-conductive armature region 213 (provided the lengths LP1 and LP2 are greater than or equal to the length LS, as shown, otherwise those lengths can also limit the maximum possible stroke). Furthermore, due to marginal effects, the maximum possible stroke at which both net force components 250, 251 act fully upon the armature is limited by a length that corresponds approximately to the diameter of the armature 201. In addition to the two-pole variant shown, alternative developments of this embodiment can also comprise a four-pole variant.

Figure 7:
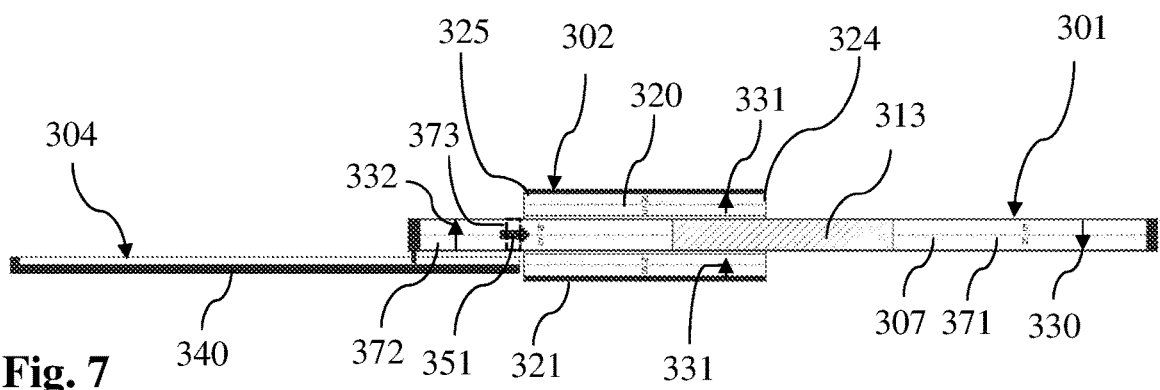
FIG. 7-9 show a longitudinal section through a fourth embodiment of the constant force generator according to the invention (different armature positions)
Figure 8:
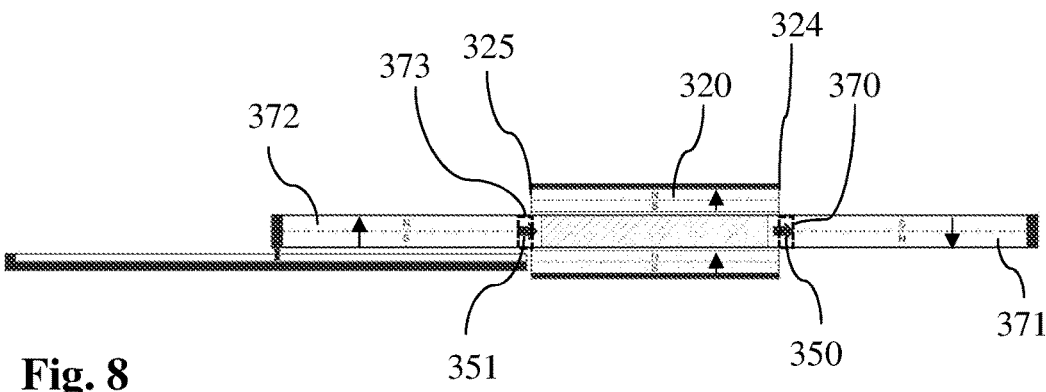
Figure 9:
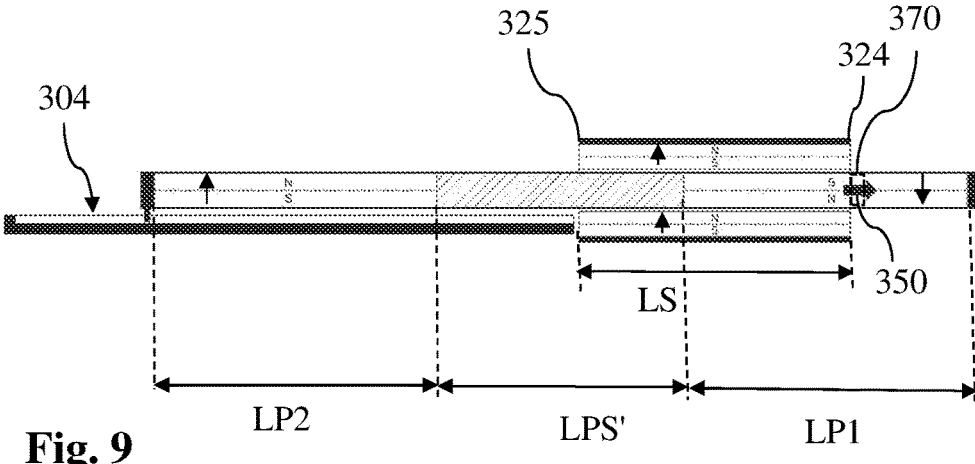

FIG. 7-FIG. 9 show a longitudinal section through a fourth embodiment of the constant force generator according to the invention, and namely in FIG. 7 in a first relative arrangement of armature and stator. This fourth embodiment comprises the stator 302 with the return tube 321, which is identical in construction to the stator 202 in the preceding embodiment (FIG. 4-FIG. 6). The armature 301 has the same cross-sectional dimensions as the respective armature of the preceding embodiments and comprises a permanently magnetic armature region 307. This permanently magnetic armature region 307 comprises a first sub-region 371 and a second sub-region 372, which are likewise identical in construction to the corresponding sub-regions of the embodiment shown in FIGS. 4 to 6 and accordingly have mutually opposite magnetization directions 330, 332 (in this case too the second sub-region 372 can, in terms of basic functionality, consist of a magnetically conductive material without magnetization, but is preferably permanently magnetic). Starting from the previous embodiment (FIG. 4-FIG. 6), the corresponding reference numerals have each been increased by one hundred. The first sub-region 371 and the second sub-region 372 are separated from one another by a magnetically non-conductive armature region 313 (for example a spacer piece made of magnetically non-conductive material) and spaced apart from one another by the length LPS' thereof (see FIG. 9). The length LPS' of the magnetically non-conductive armature region 313 is substantially the same as the length LS of the stator 302 (or deviates therefrom by ±1 armature diameter, see above). As a result, solely the longitudinal portion 373 of the second sub-region 372 is located in the inhomogeneous magnetic field close to one of the two longitudinal ends 324, 325, namely in the vicinity of the second longitudinal end 325. In this relative arrangement of stator 302 and armature 301 the first sub-region 371 does not overlap the permanently magnetic stator region 320 at all, and accordingly there is no longitudinal portion of the first sub-region 371 located in the vicinity of the first longitudinal end 324 of the permanently magnetic stator region 320 having the magnetization direction 331. It is therefore only the attractive net force component 351 that acts on the longitudinal portion 373 of the armature 301.

FIG. 8 shows a second relative arrangement of the stator and armature of the fourth embodiment of the constant force generator according to the invention. In this arrangement both the first sub-region 371 and the second sub-region 372 only just overlap the permanently magnetic stator region 320. The longitudinal portion 373 of the second sub-region 372 is therefore located close to the second longitudinal end 325 and the longitudinal portion 370 of the first sub-region 371 close to the first longitudinal end 324. Accordingly, an attractive net force component 351 acts upon the longitudinal portion 373 of the second sub-region 372 and a repulsive net force component 350 acts upon the longitudinal portion 370 of the first sub-region 371. The armature is accordingly acted upon by the sum of the two net force components which point in the same direction. Since, however, the two sub-regions 371, 372 of the permanently magnetic armature region 307 overlap the permanently magnetic stator region 320 only very slightly, the two net force components 350, 351 are reduced as a result of marginal effects. The sum of the attractive net force component 351 and the repulsive net force component 350 corresponds substantially to the attractive net force component 351 of the first relative arrangement of stator and armature.

FIG. 9 shows a third relative arrangement of the stator and armature of the fourth embodiment of the constant force generator according to the invention. In this relative arrangement only the longitudinal portion 370 is located close to one of the longitudinal ends 324, 325, namely close to the first longitudinal end 324. Accordingly, only the repulsive net force component 350 acts upon the armature 301, which net force component acts on the longitudinal portion 370 of the first sub-region 371. The repulsive net force component 350 corresponds, in terms of its strength, approximately to the attractive net force component 351 in the first arrangement; if the magnetizations of the two sub-regions 371, 372 are of the same strength, the repulsive net force component 350 is reduced by approximately 30% relative to the attractive net force component 351. In compensation, the strength of the magnetization of the second sub-region 372 can be reduced by from 10% to 40%, especially by about 20%, relative to the first sub-region 371. That reduction can be achieved, for example, via the strength of the magnetization (that is to say via magnets of different strength), but it can also be achieved via the alignment of the magnetization or via the cross-sectional geometry, thus requiring magnets that are not fundamentally different in strength. Like the third embodiment of the constant force generator according to the invention already shown in FIGS. 4-6, the length LP1 of the first sub-region 371 and the length LP2 of the second sub-region 372 are approximately the same. The entire stroke of the armature 301 over which a constant force can be provided therefore corresponds to the sum of the length LP1 of the first sub-region 371 or the length LP2 of the second sub-region 372, plus the length LPS' of the magnetically non-conductive armature region 313 (or the shorter length of the two sub-regions 371, 372, if they are of different lengths). In this case too, a securing device 304 against rotation of the armature 301 relative to stator 302 is identical in construction to the corresponding securing device 204 of the embodiment shown in FIGS. 4 to 6, the length of the linear guide means 340 being adapted to the longer stroke.

FIG. 10-FIG. 13 shows a fifth embodiment of the constant force generator according to the invention, and namely in FIG. 10 in a first relative arrangement of stator and armature. This fifth embodiment of the constant force generator according to the invention comprises the stator 402 and the armature 401, the stator 402 being identical in construction to the stator 202 and having a return tube 421, and the armature 401 (with the permanently magnetic armature region 407) being identical in construction to the armature 201 of the third embodiment shown in FIGS. 4 to 6. Corresponding reference numerals have each been increased by two hundred compared with the third embodiment. The fifth embodiment, however, comprises a further stator 406, which has a further stator region 460. In the embodiment shown, this further stator region 460 is permanently magnetic, but in terms of basic functionality it can also consist of a magnetically conductive material. The dimensions of the further stator 406 including the further—here permanently magnetic—stator region 460 correspond to those of the stator 402 and the permanently magnetic stator region 420. The magnetization direction 433 of the further permanently magnetic stator region 460 is opposite to the magnetization direction 431 of the permanently magnetic stator region 420 of the stator 402, but has the same magnetization direction 430 as the first sub-region 471 of the armature 401. The further stator 406 is arranged in fixed position relative to the stator 402. Furthermore, the further stator 406 is oriented in alignment relative to the longitudinal axis 422 of the stator 402, so that the hollow profile having the inner wall 463 of the further stator 406 is aligned with the hollow profile having the inner wall 423 of the stator 402. A distance DS (FIG. 11) between the stator 402 and the further stator 406 is in this case substantially shorter than the length LP1 of the first sub-region 471. The stators can also be arranged directly adjacent to one another (DS=0). When the armature 401 moves towards the further stator 406 in the direction of the longitudinal axis, the armature 401 consequently passes into the further stator 406, as shown in FIG. 10. In this arrangement the attractive (constant) net force component 451 acts on the longitudinal portion 473 of the second sub-region 472 having the magnetization direction 432 which protrudes at the second longitudinal end 425 of the stator 402, and the repulsive (constant) net force component 450 acts on the longitudinal portion 470 of the first sub-region 471 which protrudes from the first longitudinal end 424. Furthermore, a further, attractive (constant) net force component 452 acts on a further longitudinal portion 474 of the first sub-region 471 which protrudes from a second longitudinal end 465 of the further stator 406 relative to the first longitudinal end 464. In total, the armature 401 is acted upon by the attractive (constant) net force component 451, by the repulsive (constant) net force component 450 and by the further attractive (constant) net force component 452, which all point in the same direction.

FIG. 11 and FIG. 12 show a second and a third relative arrangement of the stator and armature of the fifth embodiment of the constant force generator according to the invention (see also FIG. 10), in each of which the armature 401 is arranged further in the direction of the further stator 406 in comparison with the first relative arrangement. Accordingly, in FIG. 11 the attractive net force component 451 acts on the longitudinal portion 473 of the second sub-region 472, the repulsive net force component 450 acts on the longitudinal portion 470 of the first sub-region 471 and the further attractive net force component 452 acts on the further longitudinal portion 474 of the first sub-region 471. In the third relative arrangement shown in FIG. 12 the armature 401 is arranged even further in the direction of the further stator 406 in comparison with the second arrangement shown in FIG. 12. Accordingly, the repulsive net force component 450 acts on the longitudinal portion 470 of the first sub-region 471, the attractive net force component 451 acts on the longitudinal portion 473 of the second sub-region 472 and the further attractive net force component 452 acts on the further longitudinal portion 474 of the first sub-region 471. Accordingly, in all three arrangements of the fifth embodiment the armature is acted upon by the repulsive net force component 450, the attractive net force component 451 and the further attractive net force component 452, all three of which point in the same direction. The total force acting on the armature in the direction of the longitudinal axis 422 can thereby be increased.

Alternatively thereto, as shown in FIG. 13, the further stator 406 can be arranged on the opposite side of the stator 402 to the arrangement shown in FIGS. 10 to 12. In this arrangement the longitudinal portion 470 of the first sub-region 471 of the armature 401 is acted upon by the repulsive net force component 450, the longitudinal portion 473 of the second sub-region 472 is acted upon by the attractive net force component 451 and the further longitudinal portion 475 is acted upon by the further repulsive net force component 453. In this case, however, the stator region 460 of the further stator 406 must be permanently magnetic, because only in that way can the repulsive net force component 453 acting upon the further longitudinal portion 475 be generated. The securing device 404 serves for securing against rotation of the armature 401 relative to the stator 402, as already described above.

Figure 14:
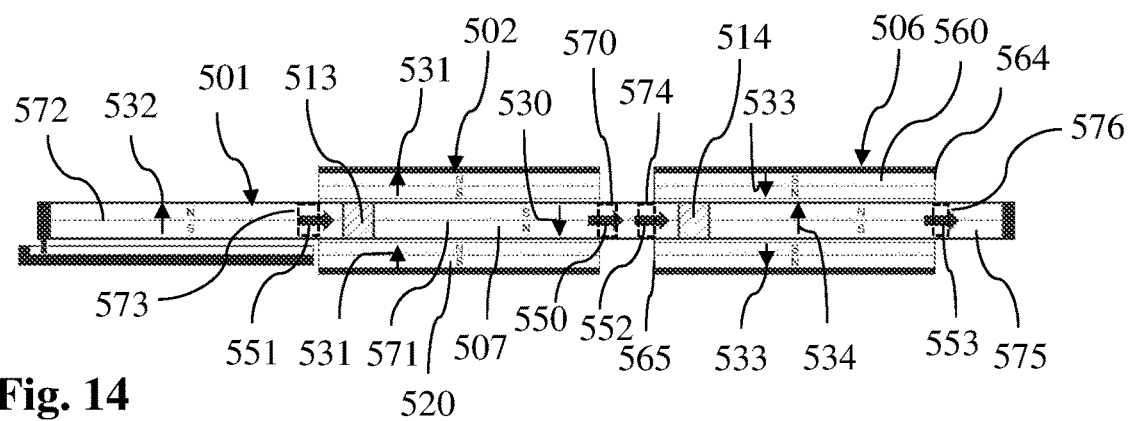
FIG. 14-16 show a longitudinal section through a sixth embodiment of the constant force generator according to the invention (different armature positions)
Figure 15:
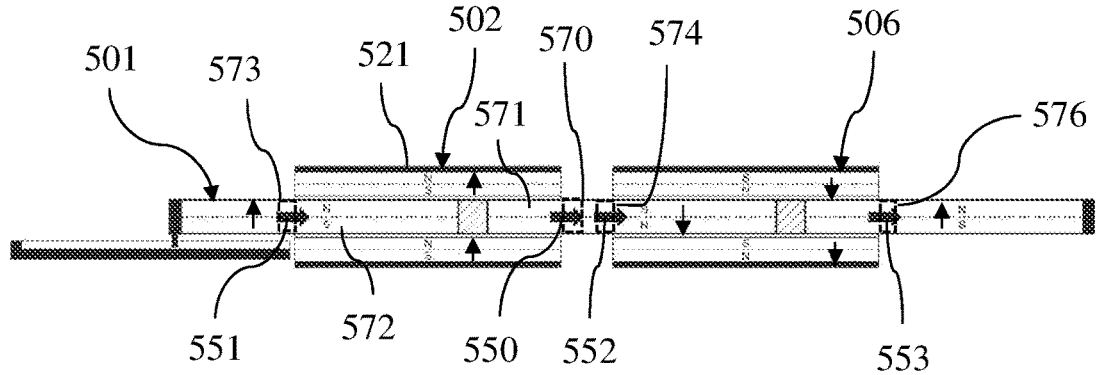
Figure 16:
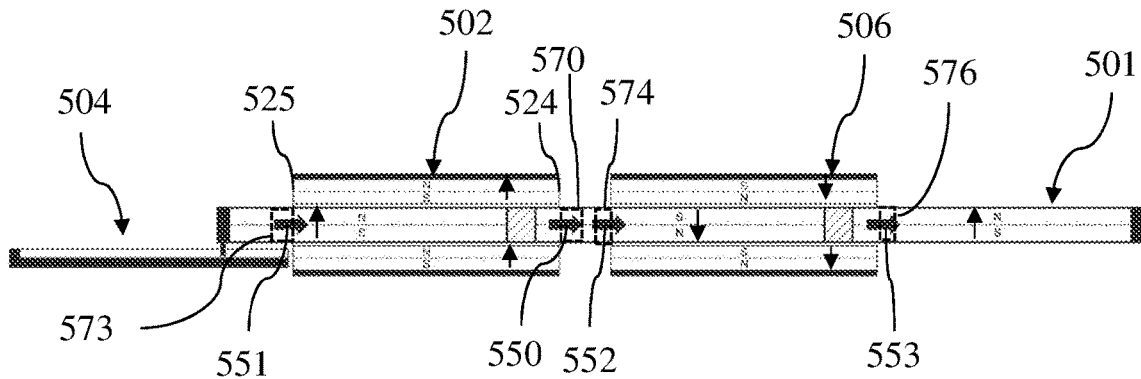

FIG. 14-FIG. 16 show a sixth embodiment of the constant force generator according to the invention, and namely in FIG. 14 in a first relative arrangement of stator 502 and armature 501, wherein the stator 502 has a return tube 521 and a permanently magnetic stator region 520 with a magnetization direction 531 as well as a first longitudinal end 524 and a second longitudinal end 525, and wherein the armature 501 has a permanently magnetic region 507 having a first sub-region 571 with a magnetization direction 530 and a second sub-region 572 with a magnetization direction 532. This embodiment corresponds to the fifth embodiment shown in FIGS. 11 to 13 but with the difference that in this sixth embodiment the permanently magnetic armature region 507 of the armature 501, in addition to comprising the first sub-region 571 and the second sub-region 572, which are each identical in construction to the corresponding first sub-region 471 and the second sub-region 472 of the permanently magnetic armature region 407 of the fifth embodiment, also comprises a third sub-region 575. Corresponding reference numerals have accordingly each been increased by one hundred. The third sub-region 575 is separated from the first sub-region 571 by a further (ideally) magnetically non-conductive armature region 514 (for example a spacer disc made of magnetically non-conductive material) (although, for reasons of basic functionality, that separation is not absolutely necessary, see above) and is identical in construction to the magnetically non-conductive armature region 513 which separates the second sub-region 572 from the first sub-region 571. Accordingly, a longitudinal portion 576 protrudes from the first longitudinal end 564 of the further permanently magnetic stator region 560 of the further stator 506 (opposite to the second longitudinal end 565 thereof). The third sub-region 575 has a magnetization direction 534 which is opposite to the magnetization direction 533 of the further permanently magnetic stator region 560. Accordingly, a further repulsive net force component 553 acts on the protruding longitudinal portion 576, which net force component repels the armature 501 away from the further stator 506. The attractive (constant) net force component 551 therefore acts upon the longitudinal portion 573 of the second sub-region 572, the repulsive (constant) net force component 550 acts upon the longitudinal portion 570 of the first sub-region 571, the further attractive (constant) net force component 552 acts upon the longitudinal portion 574 of the first sub-region 571, and the further repulsive (constant) net force component 553 acts upon the longitudinal portion 576 of the third sub-region 575, all net force components pointing in the same direction.

FIG. 15 shows a second relative arrangement of the stator and armature of the sixth embodiment of the constant force generator according to the invention in which the armature 501 has been moved further relative to stator 502 and relative to the further stator 506 in the direction of the longitudinal axis, and FIG. 16 shows a third relative arrangement of armature and stator in which the armature 501 has been moved even further in that direction. In the arrangement shown in FIG. 15, the attractive (constant) net force component 551 acts on the longitudinal portion 573 of the second sub-region 572, the repulsive (constant) net force component 550 acts on the longitudinal portion 570 of the first sub-region 571, the further attractive (constant) net force component 552 acts on the further longitudinal portion 574 of the first sub-region 571 and the further repulsive (constant) net force component 553 acts on the longitudinal portion 576 of the third sub-region 575. In the arrangement shown in FIG. 16, accordingly the attractive (constant) net force component 551 acts on the longitudinal portion 573 of the second sub-region 572, the repulsive (constant) net force component 550 acts on the longitudinal portion 570 of the first sub-region 571, the further attractive (constant) net force component 552 acts on the further longitudinal portion 574 of the first sub-region 571 and the further repulsive (constant) net force component 553 acts on the longitudinal portion 576 of the third sub-region 575. In all three relative arrangements shown in FIGS. 14 to 16, the attractive net force component 551, the repulsive net force component 550, the further attractive net force component 552 and the further repulsive net force component 553 accordingly all act upon the armature 501 and all point in the same direction. The securing device 504 serves for securing against rotation of the armature 501 relative to stator 502, as already described above.

Figure 17:
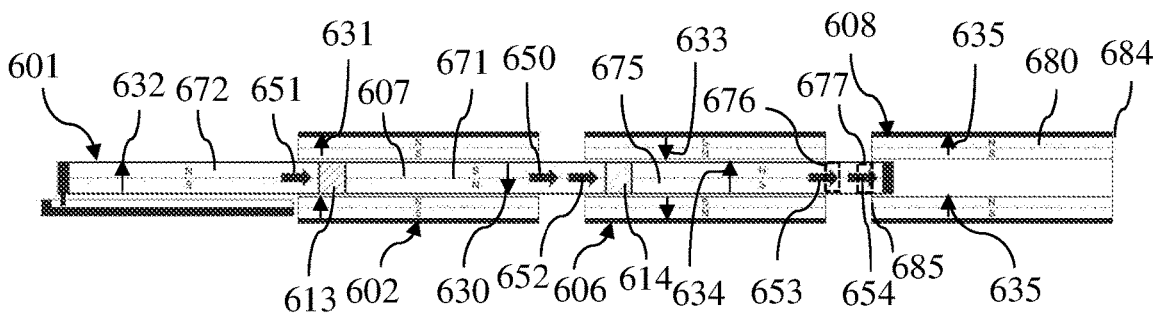
FIG. 17-19 show a longitudinal section through a seventh embodiment of the constant force generator according to the invention (different armature positions)
Figure 18:
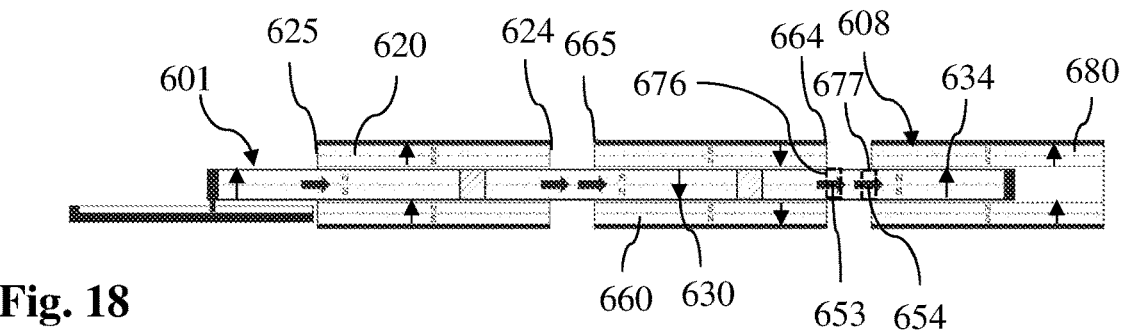
Figure 19:
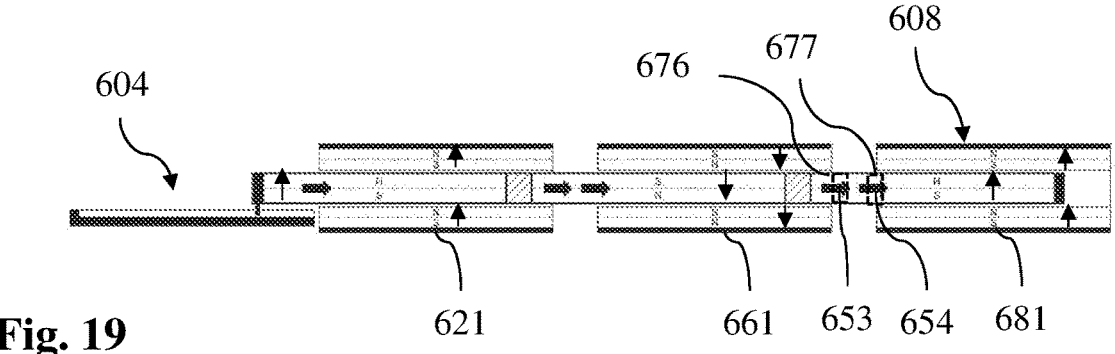

FIG. 17, FIG. 18 and FIG. 19 each show a seventh embodiment of the constant force generator according to the invention. This embodiment comprises the stator 602, which has a permanently magnetic stator region 620 with a magnetization direction 631 and a return tube 621 as well as a first longitudinal end 624 and a second longitudinal end 625. It further comprises the armature 601 with the permanently magnetic armature region 607 having the first sub-region 671 with a magnetization direction 630, the second sub-region 672 with the magnetization direction 632, and the third sub-region 675 with the magnetization direction 634. The first sub-region 671 is separated from the second sub-region 672 by the (ideally) magnetically non-conductive region 613 (for example a spacer disc) and from the third sub-region 675 by the (ideally) magnetically non-conductive region 614 (for example a spacer disc). It further comprises the further stator 606 having the permanently magnetic stator region 660 and its magnetization direction 633 and having its first longitudinal end 664 and second longitudinal end 665. Those components are identical in construction to the armature 501, the stator 502 and the further stator 506 from the sixth embodiment. In the seventh embodiment, however, the constant force generator comprises an additional stator 608 having a first longitudinal end 684 and a second longitudinal end 685, which has the same dimensions as the stator 602 and the further stator 606 and which has a permanently magnetic stator region 680 with a magnetization direction 635. The additional stator 608 is arranged relative to the further stator 606 in the same way as the further stator 606 is arranged relative to the stator 602. Accordingly, the longitudinal portion 677 of the third subregion 675 of the permanently magnetic armature region 607, which protrudes from a second longitudinal end 685 of the additional stator 608, is acted upon by an additional attractive (constant) net force component 654. The third sub-region 675 is therefore acted upon both by the further repulsive (constant) net force component 653, which acts on the longitudinal portion 676, and by the additional attractive (constant) net force component 654, which acts on the longitudinal portion 677. Furthermore, the effective forces mentioned in the preceding embodiment are also active, that is to say the further attractive (constant) net force component 652 acts upon the first sub-region 671, and the repulsive (constant) net force component 650 acts upon the first sub-region 671 and the attractive (constant) net force component 651 acts upon the second sub-region 672, if the armature is moved in the direction of the longitudinal axis into the arrangement shown in the respective Figure. In this embodiment, each of the stators 602, 606 and 608 is surrounded by its own, separate return tube 621, 661, 681. The securing device 604 serves for securing against rotation of the armature 601 relative to the stator 602, as already described above.

Figure 20:
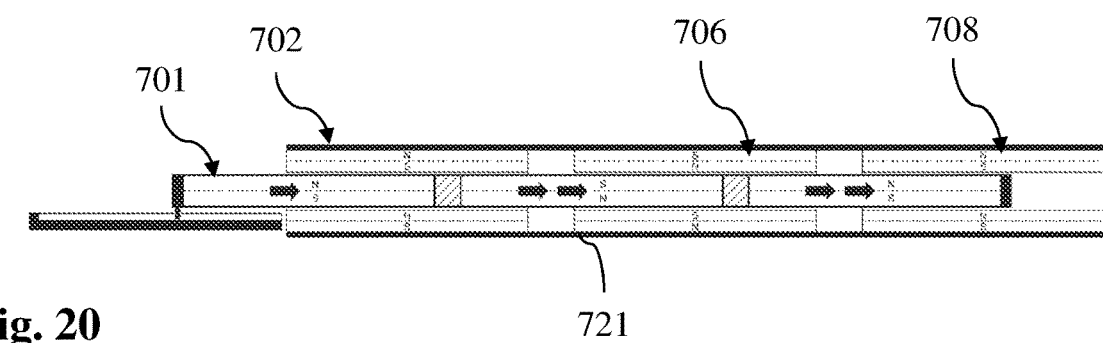
FIG. 20 shows a longitudinal section through an eighth embodiment of the constant force generator according to the invention.

FIG. 20 shows a development of the seventh embodiment of the constant force generator according to the invention, wherein the stators 702, 706 and 708 are surrounded by a common, continuous return tube 721. Accordingly, in alternative embodiments it is possible for the embodiments of the constant force generator according to the invention shown in FIGS. 10 to 16 also to have a common, continuous return tube.

FIG. 21 and FIG. 22 show an eighth embodiment of the constant force generator according to the invention (open on one side). FIG. 21 shows a perspective view and FIG. 22 shows a cross-section. The armature 801 and the stator 802 each have a rectangular profile. The embodiment shown here corresponds to the embodiment shown in FIGS. 4 to 6 with the difference that the cross-sectional profile is rectangular (instead of tubular) and is open on one side. For that purpose it must, of course, be ensured that the armature 801 has guidance and cannot escape on the open side (out of the plane of the drawing in FIG. 21; to the left in FIG. 22).

That is to say, the stator 802 and its permanently magnetic stator region 820 have a U-shape (with arms arranged at right-angles). The permanently magnetic stator region 820 has a magnetization direction 831 and a first longitudinal end 824 and a second longitudinal end 825 as well as a return tube 821 that is open on one side.

Furthermore, the armature 801 and its permanently magnetic armature region 807, including the first sub-region 871 and the second sub-region 872, are rectangular and movable in the direction of the longitudinal axis 822. The magnetization direction 832 of the second sub-region 872, the magnetization direction 830 of the first sub-region 871 and the magnetization direction 831 of the permanently magnetic stator region 820 correspond to those of the third embodiment shown in FIG. 4-6. The mode of operation is therefore the same as in that third embodiment and therefore need not be described again; the repulsive (constant) net force component 850 and the attractive (constant) net force component 851 are effective. As a result of the rectangular profile, however, an anti-rotation device is unnecessary, but a guide means is required in order that the armature cannot escape.

Accordingly, all the embodiments shown in the preceding Figures can either be in the form of tubular constant force generators or in the form of constant force generators having a rectangular profile. Moreover, all the embodiments shown in the preceding Figures can be in the form of two-pole or four-pole constant force generators.

FIG. 23 shows an embodiment of a linear drive system according to the invention. The linear drive system comprises a linear motor 907 (for example a tubular linear motor) having a motor stator 908 and a motor armature 909. The linear drive system according to the invention further comprises two constant force generators 900 according to the invention. The stators 902 of the two constant force generators 900 and the motor stator 908 are mounted in a common housing 903. The motor armature 909 and the armatures 901 of the two constant force generators 900 are axially fixedly connected to one another by a connecting device 903—here in the form of a plate—while the connection to the plate in a direction perpendicular to the axial direction (direction of the longitudinal axis) need not be totally fixed. In this exemplary embodiment the armature 901 of the respective constant force generator 900 need not be secured against rotation relative to the stator.

The constant force generator according to the invention and the linear drive system according to the invention have been explained above with reference to embodiments. The invention is not limited to those embodiments, however, but is also intended to include those embodiments which make use of the technical teaching of the invention. For example, where an attractive net force component needs to be generated it is possible for a magnetically conductive region to be provided instead of a permanently magnetic region, provided this is not precluded on other technical grounds. The scope of protection is therefore defined by the following patent claims.

The invention claimed is:

1. A constant force generator, especially a tubular constant force generator, comprising:

a stator which has a longitudinal axis and a permanently magnetic stator region, wherein the permanently magnetic stator region has a first longitudinal end and a second longitudinal end which is located axially opposite the first longitudinal end, and an armature which is arranged so as to be movable relative to the stator over a stroke in the direction of the longitudinal axis, which armature has a permanently magnetic armature region, wherein the permanently magnetic stator region and at least in part also the permanently magnetic armature region are each magnetized in a magnetization direction perpendicular to the direction of the longitudinal axis, and wherein the permanently magnetic stator region and the permanently magnetic armature region are arranged so as to be only partly overlapping in the direction of the longitudinal axis over the entire stroke of the armature, so that a magnetic force acting between the permanently magnetic stator region and the permanently magnetic armature region has a net force component in the direction of the longitudinal axis that is constant over the entire stroke, and wherein the permanently magnetic armature region has a first sub-region which has a magnetization having a net magnetization component in a direction opposite to the magnetization direction of the permanently magnetic stator region, so that in the case of an only partly overlapping arrangement of the first sub-region and the permanently magnetic stator region such that a longitudinal portion of the first sub-region protrudes from the permanently magnetic stator region in the direction of the longitudinal axis solely at the first longitudinal end of the permanently magnetic stator region, the net force component which is constant over the entire stroke comprises a repulsive constant net force component which repels the armature away from the first longitudinal end of the stator in the direction of the longitudinal axis.

2. The constant force generator according to claim 1, wherein the direction of the magnetization of the first sub-region of the permanently magnetic armature region is opposite to the magnetization direction of the permanently magnetic stator region.

3. The constant force generator according to claim 1, wherein the direction of the magnetization of the first sub-region of the permanently magnetic armature region and the magnetization direction of the permanently magnetic stator region enclose an obtuse angle.

4. The constant force generator according to claim 1, wherein the strength of the magnetization of the permanently magnetic stator region, viewed in the direction of the longitudinal axis, is constant over the length of the permanently magnetic stator region in order to generate a magnetic field which, viewed in the direction of the longitudinal axis, is homogeneous over the length of the permanently magnetic stator region and declines away from the first longitudinal end and from the second longitudinal end of the permanently magnetic stator region, viewed along the longitudinal axis, and wherein the strength of the magnetization of the first sub-region of the permanently magnetic armature region, viewed in the direction of the longitudinal axis, is constant over the length of the first sub-region of the permanently magnetic armature region.

5. The constant force generator according to claim 1, wherein the permanently magnetic armature region has a second sub-region which either is permanently magnetic and has a magnetization having a net magnetization component in a direction identical with the magnetization direction of the permanently magnetic stator region, or which consists of a magnetically conductive material, so that in the case of an only partly overlapping arrangement of the second sub-region and the permanently magnetic stator region such that a longitudinal portion of the second sub-region protrudes from the permanently magnetic stator region in the direction of the longitudinal axis solely at the second longitudinal end of the permanently magnetic stator region, the net force component which is constant over the entire stroke comprises an attractive constant net force component which attracts the armature towards the second longitudinal end of the stator in the direction of the longitudinal axis, the attractive and repulsive constant net force components pointing in the same direction, wherein in the case of the only partly overlapping arrangement of the first sub-region and the permanently magnetic stator region such that a longitudinal portion of the first sub-region protrudes from the permanently magnetic stator region in the direction of the longitudinal axis solely at the first longitudinal end of the permanently magnetic stator region, the repulsive constant net force component acts on the protruding longitudinal portion of the first sub-region, and wherein in the case of the only partly overlapping arrangement of the second sub-region and the permanently magnetic stator region such that a longitudinal portion of the second sub-region protrudes from the permanently magnetic stator region in the direction of the longitudinal axis solely at the second longitudinal end of the permanently magnetic stator region, the attractive constant net force component acts on the protruding longitudinal portion of the second sub-region.

6. The constant force generator according to claim 5, wherein in the case where the second sub-region of the permanently magnetic armature region is permanently magnetic, the strength of the magnetization of the second sub-region is constant over its length in relation to the direction of the longitudinal axis, and in the case where the second sub-region of the permanently magnetic armature region is magnetically conductive, the magnetic conductivity of the second sub-region is constant over its length, viewed in the direction of the longitudinal axis.

7. The constant force generator according to claim 5, wherein the first sub-region and the second sub-region of the permanently magnetic armature region are arranged spaced apart from one another in the direction of the longitudinal axis by a distance that is smaller than 90% of the length of the permanently magnetic stator region.

8. The constant force generator according to claim 5, wherein the first sub-region and the second sub-region of the permanently magnetic armature region are arranged spaced apart from one another in the direction of the longitudinal axis by a distance that is substantially the same as the length of the permanently magnetic stator region.

9. The constant force generator according to claim 5, wherein the first sub-region and the second sub-region of the permanently magnetic armature region are both permanently magnetic, and wherein the strength of the magnetization of the second sub-region of the permanently magnetic armature region is reduced by from 10% to 40% relative to the strength of the magnetization of the first sub-region of the permanently magnetic armature region.

10. The constant force generator according to claim 1, wherein the constant force generator comprises a further stator having a further stator region which either is permanently magnetic and has a magnetization having a net magnetization component in the direction of the magnetization of the first sub-region of the permanently magnetic armature region, or which consists of a magnetically conductive material, wherein the further stator region has a further first longitudinal end as well as a further second longitudinal end which is located axially opposite the further first longitudinal end, and wherein the further second longitudinal end of the further stator region faces towards the first longitudinal end of the permanently magnetic stator region, wherein the first sub-region of the permanently magnetic armature region and the further stator region are arranged so as to be only partly overlapping in the direction of the longitudinal axis in such a way that a further longitudinal portion of the first sub-region protrudes from the further permanently magnetic stator region in the direction of the longitudinal axis solely at the further second longitudinal end of the further permanently magnetic stator region, so that a magnetic force acting between the first sub-region and the further stator region has a further constant net force component in the direction of the longitudinal axis which attracts the armature towards the further stator in the direction of the longitudinal axis, that further constant net force component pointing in the same direction as the repulsive constant net force component.

11. The constant force generator according to claim 10, wherein in the case where the further stator region is permanently magnetic, the strength of the magnetization of the permanently magnetic further stator region is constant over its length, viewed in the direction of the longitudinal axis, in order to generate a magnetic field which, viewed in the direction of the longitudinal axis, is homogeneous over the length of the further permanently magnetic stator region and declines away from the further first longitudinal end and from the further second longitudinal end of the further permanently magnetic stator region, viewed along the longitudinal axis, and in the case where the further stator region is magnetically conductive, the magnetic conductivity of the magnetically conductive further stator region is constant over its length, viewed in the direction of the longitudinal axis.

12. The constant force generator according to claim 1, wherein the constant force generator, especially the tubular constant force generator, comprises a securing device against rotation of the armature relative to the stator about the longitudinal axis.

13. A linear drive system having a linear motor, especially a tubular linear motor, which comprises a motor stator having a drive longitudinal axis, and a motor armature which is movable relative to the motor stator in the direction of the drive longitudinal axis, wherein the linear drive system further comprises a constant force generator according to claim 1.

14. The linear drive system according to claim 13, wherein the motor armature is axially fixedly connected to the armature of the constant force generator.

15. The linear drive system according to claim 13, wherein the linear drive system comprises at least two constant force generators wherein armatures of the at least two constant force generators are axially fixedly connected to one another and axially fixedly connected to the motor armature.

* * * * *